UNITED STATES PATENT OFFICE.

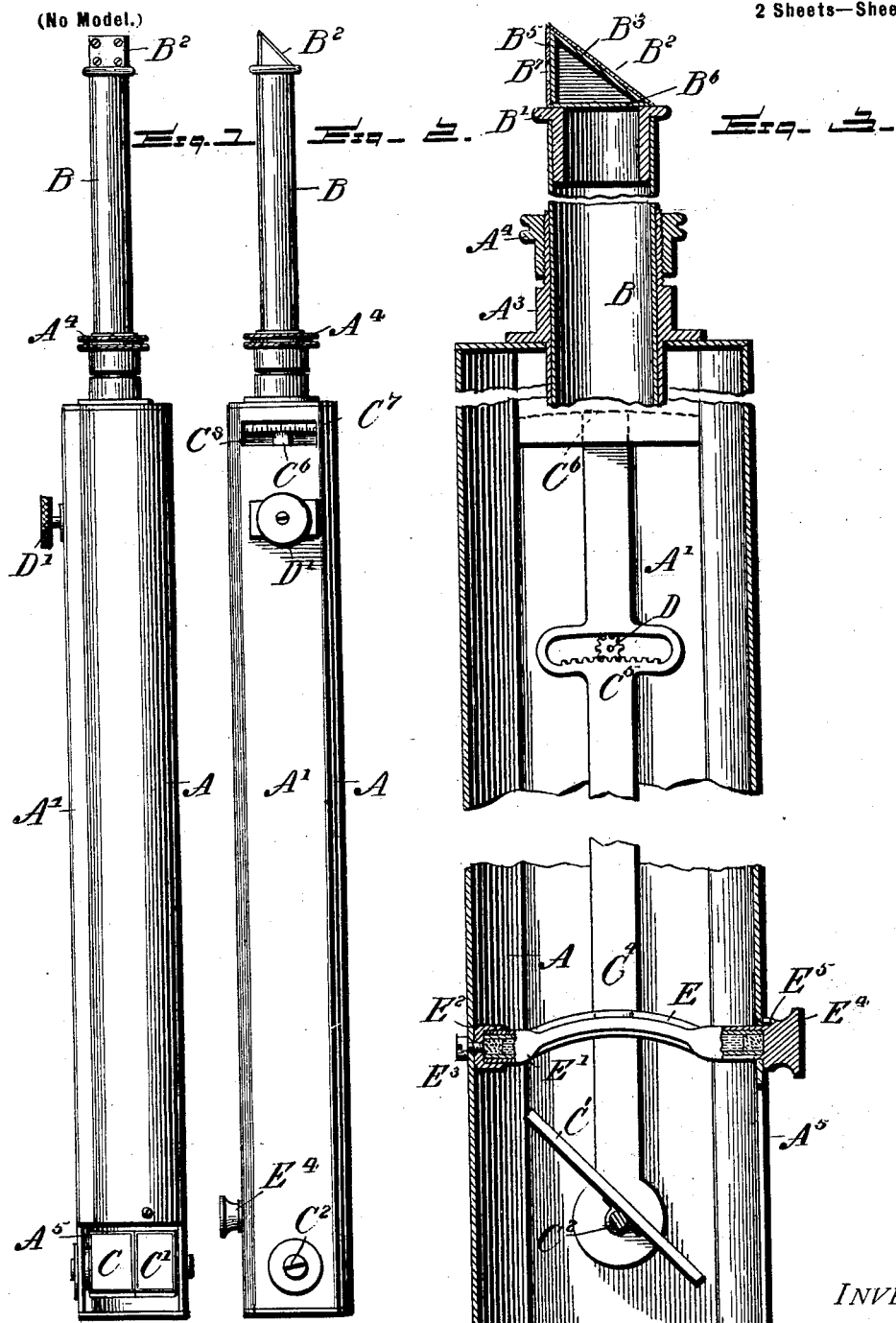

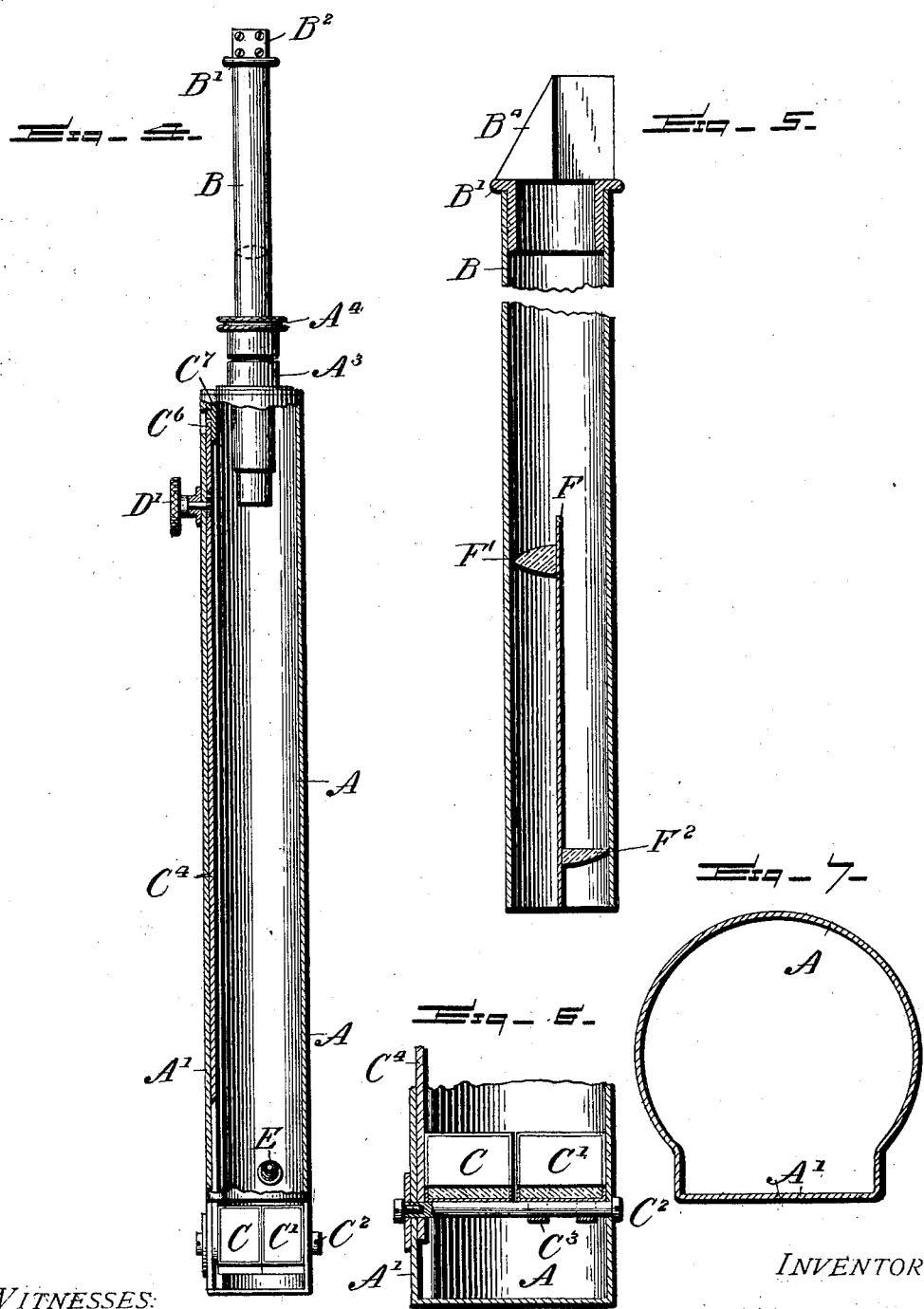

GEORGE M. SEARLE AND GEORGE N. SAEGMULLER, OF WASHINGTON, DISTRICT OF COLUMBIA.

DISTANCE INSTRUMENT.

SPECIFICATION forming part of Letters Patent No. 686,770, dated November 19, 1901.

Application filed February 6, 1901. Serial No. 46,229. (No model.)

*To all whom it may concern:*

Be it known that we, GEORGE M. SEARLE and GEORGE N. SAEGMULLER, citizens of the United States, residing at Washington, in the District of Columbia, have invented certain new and useful Improvements in Distance Instruments, of which the following is a specification, reference being had therein to the accompanying drawings.

This invention relates to distance or elevation instruments, and will be hereinafter described particularly in its application as a range-finder, while it is also adapted for use as a level, sextant, and for other purposes.

The invention has for its object to provide a structure embodying a fixed and movable mirror adapted to coöperate with a fixed mirror or prism arranged in the same plane at a predetermined distance above the lower mirror, whereby the reflection of an object from the movable mirror may be brought into alinement with the reflection of a fixed object from the fixed mirror.

A further object of the invention is to apply the spirit-level above the fixed mirror and to locate the sight-opening to the mirror or prism at a distance from this level equal to the radius of the curvature of the level, measured from the sight-opening to the sight-mirror and thence to the level, thus keeping the apparent position in the bubble in the level always upon a horizontal plane.

A further object of the invention is to provide means by which the degree of movement or deflection of the movable mirror may be measured to obtain the proper result after sighting or other purposes.

Other objects and advantages of the invention will hereinafter appear in the following description, and the novel features thereof will be particularly pointed out in the appended claims.

In the drawings, Figure 1 is a front elevation of the instrument. Fig. 2 is a side elevation thereof. Fig. 3 is an enlarged vertical section. Fig. 4 is an elevation similar to Fig. 1 with parts in section at a right angle to the section shown in Fig. 3. Fig. 5 is a modified form of telescoping tube used with the invention. Fig. 6 is an enlarged detail section showing the manner of mounting the fixed and movable mirrors, and Fig. 7 is an enlarged cross-section through the casing or tube.

Like letters of reference indicate like parts throughout the several figures of the drawings.

In the drawings the letter A designates a casing or tubular body, which may be of any desired configuration, but is preferably cylindrical in its main portion and provided with a straight or flattened side A' for a purpose to be hereinafter described. At the upper end of this casing a telescoping tube B is applied and is secured in its proper adjusted position by means of a threaded collar $A^3$ and a clamping-nut $A^4$, threaded thereon to compress the collar into contact with the tube. At the upper end of the tube B a sleeve B' is provided, upon which is mounted the casing $B^2$ of triangular form, adapted to contain upon its inclined wall a mirror $B^3$, as shown in Fig. 3, or a prism $B^4$, as shown in Fig. 5, these devices being considered equivalents for the purposes of this invention. If desired, a transparent plate $B^5$ may be used opposite the mirror and a similar plate $B^6$ at the upper end of the tube B. These plates if used are merely for the purpose of protecting the mirror against moisture or dust in the use of the invention. Opposite the mirror and in the straight wall of the triangular casing $B^2$ is a sight-aperture $B^7$.

The lower end of the casing A is provided with an opening $A^5$ opposite the mirrors supported therein. These mirrors comprise a movable mirror C and a fixed mirror C', located parallel to each other. Various means may be employed for mounting and operating these mirrors, but as one means adapted for that purpose I have shown the same as supported upon a rod $C^2$, with the mirror C' secured to said rod by means of strips $C^3$ or other suitable devices, while the movable mirror C is located in a plane common to the fixed mirror and secured to the lower end of an operating-lever $C^4$, pivoted at its lower portion upon the rod $C^2$. For the purpose of moving this lever and shifting the mirror to the necessary extent a segmental rack $C^5$ is provided upon the lever and adapted to coöperate with a pinion D' extending inward from a suitable adjusting-button D', located upon the flat face of the casing, which face is especially provided to permit the oscillation of the operating-lever C⁴ in a straight plane. The upper end of the operating-lever is provided with suitable indications C⁶, adapted to coöperate with a vernier C⁷, by means of which the extent of movement may, by a proper marking based upon well-known formulas, indicate the necessary elevation of a gun-sight or other measure desired through a suitable aperture C⁸, formed in the casing.

Above the fixed mirror a spirit-level E is suitably supported and, if desired, curved upon the radius previously described. For the purpose of illustration this curvature has been somewhat exaggerated in Fig. 3. As showing one means for mounting this level an open sleeve or casing E' has been provided, within which the transparent body E of the level may be inserted, and one end of this casing fits into a suitable socket E², held upon a wall of the casing by means of a screw E³, while the opposite end of the casing is provided with a handle or knob E⁴, having a recess adapted to receive a pin E⁵, projecting from the case A, by means of which the level may always be inserted in the proper position for use and removed when desired.

The bubble of the level E is ordinarily intended to be viewed with the naked eye in the mirror B² or prism B⁴; but when objects at a great distance are to be viewed or of a comparatively smaller character it is desirable to provide the telescoping tube or substitute therefor another tube with suitable lenses or object-glass, as shown in Fig. 5, where a partition F is used having a lens F' at one side adapted to coöperate with the movable mirror and magnify objects reflected therefrom, while on the opposite side of the partition a lens F² of different power may be located at any preferred distance from the fixed mirror C' to magnify objects reflected from said mirror. In the use of these lenses one-half glasses will be used, and they should be of such a focal length and so disposed in the tube as to bring the bubble of the level in focus with the object viewed and to make the movement of the image of the bubble equal to that of the image of the object. If the tube be used without the spirit-level, as hereinafter described, a simple telescopic lens may be substituted for the construction shown in Fig. 5—for instance, as indicated by dotted lines in Fig. 4.

In the operation of this invention the spirit-level, which is located above the fixed mirror C', is illuminated by said mirror and the image therefrom thrown upon the mirror B², which is placed at an angle of forty-five degrees to the axis of the tube and parallel with the mirror C'. For the purpose of preventing a confusion of reflected objects with the bubble of the level this fixed mirror may be covered when desired with a translucent substance to prevent the reflection of exterior objects, as its use in connection with the level is that of an illuminating medium. The level is curved, as previously described, and the distance from the sight-opening B⁷ to the mirror B² and thence to the bubble of the level is equal to the radius of the curvature of the level, thus causing the bubble to always appear on a horizontal line from the sight-hole B⁷, although the tube be not held in a perfectly-vertical position. In using the instrument the operator finds the reflected bubble upon the mirror B² and then by means of the adjusting-handle D' oscillates the mirror C upon its pivot to bring the image of the object reflected in said mirror into alinement with the image of said bubble. When the images are thus in alinement, the instrument is properly adjusted, and the object on which the center of the bubble is seen will be on a level with the eye. This movable mirror thus determines the angular deviation of any object from the level, and the result of such movement is indicated upon the vernier C⁷ by means of the extended end C⁶ of the operating-lever. The amount of movement of the mirror C will be one-half the deviation of the object from the horizontal and is conveniently measured upon the vernier by well-known formulas for that purpose.

When the instrument is used at sea, where the offing or the line of the horizon is visible, the spirit-level E may be removed and also the translucent covering from the fixed mirror. This mirror then reflects the line of the offing, while the movable mirror is adjusted to reflect an image of an object into a line coincident with the offing. Whether used with the spirit-level or not it will be observed that the movement of the pivoted mirror relative to the fixed mirror will enable the reciprocal or cotangent of the angle of rotation to be measured, and the vernier may be properly graduated to give the actual distance by direct inspection for a known and constant height of the observer above the level of the sea.

If the mirrors, or, if preferred, a prism or prisms, are placed at some distance below the level, so as to obtain a reflection of the sun or other object elevated at a material distance above the horizon, this device will serve all of the purposes of a sextant for the measurement of altitudes, or in many instances it may similarly serve for small altitudes or depressions, and can in this way, if the height of the observer above the level of the sea be known, give the distance of an object on the level of the sea or at a height above it.

It will be observed that changes may be made in the details of construction and configuration of the several parts without departing from the spirit of the invention as defined by the appended claims, and it will also be evident that the instrument may be applied and used in various relations and for numerous purposes not specified by the foregoing specification.

What is claimed is—

1. In an elevation instrument, a curved level and a sight-opening exposing the same to observation located at distances therefrom equal to the radius of said level; substantially as specified.

2. In an elevation instrument, a casing having at its lower portion a fixed mirror and a pivoted mirror mounted in a plane common to the fixed mirror, means at the upper portion of said casing for viewing the images from said mirrors in parallelism, and a spirit-level located between said fixed mirror and the image-viewing means; substantially as specified.

3. In an elevation instrument, a casing having at its lower portion a fixed mirror and a pivoted mirror mounted in a plane common to the fixed mirror, means at the upper portion of said casing for viewing the images from said mirrors in parallelism, a curved spirit-level above said fixed mirror, and means for measuring the movement of said movable mirror; substantially as specified.

4. In an elevation instrument, a curved spirit-level secured therein, a mirror above said level and in alinement with a sight-hole located at a distance by way of said mirror from said level equal to the radius of the curvature of the level; substantially as specified.

5. In an elevation instrument, a curved spirit-level secured therein, a mirror above said level and in alinement with a sight-hole located at a distance from said level equal to the radius of the curvature of the level and a mirror below said level for the purpose of illuminating the same and the reflection of external objects; substantially as specified.

6. In an elevation instrument, a curved spirit-level secured therein, a mirror above said level and in alinement with a sight-hole located at a distance from said level equal to the radius of the curvature of the level, a mirror below said level for the purpose of illuminating the same and the reflection of external objects, an arm attached to a movable member of said mirror by which the mirror can be rotated and the extent of movement measured upon a coöperating scale; substantially as specified.

7. In an elevation instrument, the combination with a casing, of a tube at its upper end provided with means for reflecting an image, a fixed mirror at the lower portion of said case parallel with one face of said reflecting means, a spirit-level located between said fixed mirror and reflecting means and a movable mirror adapted to oscillate in a plane parallel to said fixed mirror; substantially as specified.

8. In an elevation instrument, the combination with a casing, of a tube at the upper end provided with means for reflecting an image, a fixed mirror at the lower portion of said case parallel with one face of said reflecting means, a spirit-level located between said fixed mirror and reflecting means, a movable mirror adapted to oscillate in a plane parallel to said fixed mirror, an operating-arm secured to the axis of said movable mirror and provided with rack-teeth and pinion, an operating-handle and gear therefor coöperating with said teeth, and a vernier located at the upper end of said arm; substantially as specified.

9. An elevation instrument comprising a vertically-disposed tube having an opening at its lower portion, a fixed mirror supported at an angle to the axis of said tube opposite said opening, a movable mirror pivoted in a plane common to said fixed mirror, whereby the images from both mirrors may be viewed in parallelism, and means for oscillating said movable mirror relative to said fixed mirror; substantially as specified.

10. An elevation instrument provided with a reflecting-mirror located within a casing, a tube at the upper portion of said casing provided with a central partition, and an object-glass located in each division of said tube; substantially as specified.

11. An elevation instrument comprising a casing, a spirit-level supported therein, a stationary mirror beneath said level, an oscillating mirror mounted upon the axis of said stationary mirror, a tube at the upper end of said casing provided with a central partition, object-glasses in said tubes located at different distances from said mirrors and on opposite sides of said partition, and a reflecting device at the upper end of said tube; substantially as specified.

12. In an elevation instrument, a casing comprising a tubular portion having a flat face and an opening at the upper portion thereof, an oscillating mirror at the lower end of said casing, an operating-arm for said mirror extending upward from the axis of said mirror at one side thereof toward the top of said casing and adapted to operate parallel with said flat face and across the opening therein; substantially as specified.

In testimony whereof we affix our signatures in presence of two witnesses.

GEORGE M. SEARLE.
GEORGE N. SAEGMULLER.

Witnesses:
ALFRED T. GAGE,
GEORGE M. BOND.